(12) United States Patent
Daley, III (10) Patent No.: US 8,014,138 B2
(45) Date of Patent: Sep. 6, 2011

(54) BAG COMPUTER MANUAL CHARACTER INPUT DEVICE AND COVER

(76) Inventor: Charles A. Daley, III, Rawai (TH)

( * ) Notice: Subject to any disclaimer, the term of this patent is extended or adjusted under 35 U.S.C. 154(b) by 857 days.

(21) Appl. No.: 12/004,637

(22) Filed: Dec. 26, 2007

(65) Prior Publication Data

US 2009/0009476 A1    Jan. 8, 2009

Related U.S. Application Data

(60) Provisional application No. 60/958,237, filed on Jul. 5, 2007, provisional application No. 60/962,317, filed on Jul. 30, 2007.

(51) Int. Cl.
*G06F 1/16* (2006.01)
(52) U.S. Cl. .................................. 361/679.03
(58) Field of Classification Search .............. 361/679.03
See application file for complete search history.

(56) References Cited

U.S. PATENT DOCUMENTS

| | | | | |
|---|---|---|---|---|
| 6,283,299 B1 * | 9/2001 | Lee | ............................ | 206/760 |
| 6,381,127 B1 * | 4/2002 | Maddali et al. | ......... | 361/679.55 |
| 7,293,649 B2 * | 11/2007 | Gelphman et al. | ........... | 206/320 |
| 2005/0103815 A1 * | 5/2005 | Lee et al. | ...................... | 224/275 |
| 2006/0113203 A1 * | 6/2006 | Daley | ............................. | 206/320 |
| 2006/0113213 A1 * | 6/2006 | Daley, III | ..................... | 206/576 |
| 2006/0163303 A1 * | 7/2006 | Trutanich | ..................... | 224/576 |
| 2007/0199844 A1 * | 8/2007 | Daley, III | ..................... | 206/320 |
| 2007/0201201 A1 * | 8/2007 | Daley, III | ..................... | 361/683 |
| 2008/0192421 A1 * | 8/2008 | Daley | ............................ | 361/681 |
| 2008/0273298 A1 * | 11/2008 | Daley | ............................ | 361/683 |

\* cited by examiner

*Primary Examiner* — Lisa Lea Edmonds (57) ABSTRACT

Disclosed is a manual character input device, such as a keyboard or electronic write pad, designed for removable mounting and operation on the front of a bag computer. A keyboard may be ten full size keys wide with thumb keys for missing keys to right and left, may have tactile finger guides and actuating keys adapted for vertical use. The input device attaches by its back or pivotally by one edge. Edge mounts may be a channel, clip, half hinge axle or bearing or clamp and may include a hinge means for non-pivoting bag front mounts. Alignment structures may be included and may form a cover to protect the bag computer/display. Electrical connection to the computer may lead from the input device's back or edge and may be a wire and plug or may be built into the attachments. Alternatively, the input device may have a wireless electrical connection.

26 Claims, 11 Drawing Sheets

BAG COMPUTER MANUAL CHARACTER INPUT DEVICE AND COVER

CROSS-REFERENCE TO RELATED APPLICATIONS

This application claims the filing benefit under 35 U.S.C. §119(e) of U.S. Provisional Application No. 60/958,237, filed on Jul. 5, 2007, the entire teachings of which are incorporated herein by reference.

This application claims the filing benefit under 35 U.S.C. §119(e) of U.S. Provisional Application No. 60/962,317, filed on Jul. 30, 2007, the entire teachings of which are incorporated herein by reference.

Related to patent application Ser. No. 11/796,920, filed on May 1, 2007

Related to patent application Ser. No. 11/799,011, filed on May 1, 2007

TECHNICAL FIELD

The present invention relates to a mobile input device meant to be operated while mounted on a computer bag front.

BACKGROUND OF THE INVENTION

People have become dependent on computers. Now they want to have their computer handy for use at any time. Bag computers such as U.S. patent applications Ser. Nos. 11/163,763, 11/001,428, 11/796,920 and 11/799,011 introduce a new way to carry and use a computer in a mobile environment. These computers have bag and computer components combined to hold a display on the bag's front so it can pivot into the line of sight of the operator. Among these components may be a removable manual character input device such as a keyboard or electric write pad.

There are many independent keyboards of a wide variety of sizes and arrangements. Most are meant to mount flat on a table to be used with a desk top computer. They are often 1.5 feet across and cannot be reasonably mounted on a bag front. The large number of keys makes the keyboard large and placement of the hands difficult without looking. There have been attempts to mitigate this situation. 20020097227 is a keyboard ten keys wide with one row and thumb keys to designate other needed rows. Although it is compact, the letter keys are not "normal", a crucial need for typing with two hands. A keyboard with the keys "a" to ";" wide and thumb keys for keys farther to the sides was disclosed as part of a wearable computer in U.S. Pat. No. 6,167,413. U.S. Pat. No. 4,847,799 also used thumb keys.

Minimal or missing distinguishing tactile features further complicates "no look" typing on normal keyboards. Many keyboards have tactile finger references such as the small bumps on the "F" and "J" keys of the standard QWERTY keyboard but these may not be sufficiently obvious for use in the mobile environment. Keyboard U.S. Pat. Nos. 4,449,839 and 4,778,295 has troughs for keys.

Independent keyboards are occasionally meant to be fastened down and this is usually done with holes on the bottom of the keyboard meant for match fasteners. They are not designed to mount on or to pivot horizontally on a bag front. Laptop, two panel computers have keyboards that fit to their display units but their keyboard is fixed to the computing unit and cannot be separated from it. In the few computers of this type which do have removable keyboards, the keyboards are not configured as major protective cover for the display/computer. For example, Japanese utility model laying-open No. 60-148632 (FIG. 3 and 4 in U.S. Pat. No. 5,034,858) and U.S. Pat. No. 5,247,285 are desk tops meant to be used vertically and have a keyboard removably stored on the front of the computer. A keyboard that must be removed for use is a liability in the mobile environment. They are meant to be used on a desk with the keyboard setting on the desk between the operator and the rest of the computer.

Independent desk top keyboards may be connected to the computer with a wire or wireless so that the keyboard can be moved relative to the user. However, because the computer and operator are on opposite side of the keyboard, the keyboard to computer connection does not face the operator.

Other keyboards for mobile use also have drawbacks. For example, independent keyboards which mount on wrist bands cannot be used with two hands. Handheld computer often do not have independent keyboards and cannot be large enough for two hand typing.

What is needed then is a manual character input device made to be removably mounted on a bag front to make it replaceable or exchangeable and to make the bag component less expensive. If the input device is a keyboard, it should have standard size keys and tactile features for two hand typing on the bag front. Such a keyboard should have a surface adapted to cleaning and use in a variety of environments. The input device should be capable of pivoting on the bag front and should have attachments for this purpose to match the bag. The input device should be able to fit the bag computer and, if needed, have alignment structures to fit it to and protect the display and/or computer on the bag front. The input device should have a communication link positioned for the most efficient connection with the bag's computing unit.

BRIEF SUMMARY OF THE INVENTION

This invention, a manual character input device, is a means to manually enter character information into a bag computer. It may be removably mounted to the outside of a bag computer's front so that it may be used with two hands while the operator is standing or sitting.

The input device may be a keyboard, an electronic write pad or a cover without electronics to protect a bag's computer/display when a separate character input is not needed.

For better bag computer operation, the keyboard may be reduced in size with 10 full size keys across and thumb keys to substitute for keys normally to the left and right. There may be tactile finger, thumb and palm guides, the surface may be continuous with small button keys for easier cleaning, weather proofing and easier use in the vertical position.

The input device may have attachments on its back for mounting on the bag front or on a pivoting cover flap or mounting bracket. Instead, the input device may have one or more attachments on the edge closest to the thumb operated keys so that it may attach to a hinge means on the bag front. Possible attachment types include channel, Velcro, clip, half hinge axle or bearing, clamp, bracket, buttons, plugs or snaps, to name a few. Alternatively, the input device edge attachments may include a hinge means for bags with a stationary mount on its front. The hinge means may be the axle bearing type or made of flexible fabric.

The input device may include alignment structures to mate it with the bag computer computer/display, also found on the bag front, so to protect them from damage. The input device may then form a box-like cover for the bag's computer/display.

An electrical connection is provided to connect the input device with the bag's computer. It may be a plug or wire leading from the input device's back for mounting on the bag front, cover flap or other pivoting holder. Instead the electrical connection may lead from one edge and may be a wire or plug or may be built into the input device attachment to match a complimentary fitting on the bag's front.

Alternatively, the electrical connection may be wireless and the input device would then include power, broadcasting/receiving equipment and antenna to send the input information to the bag's computer.

The outboard edge or back of the input device may include a camera, external infrared communicator or other sensors or communication equipment so they can be pointed at a target.

BRIEF DESCRIPTION OF THE DRAWING

FIG. 5A This view shows the lateral entry (channel) edge mount
FIG. 5B This is blow up of lateral entry (channel) edge mount on the input device edge.
FIG. 6A This is the half hinge axle and bearing mount arrangement.
FIG. 6B This is a blow up of the input device axle for half hinge axle and bearing mount
FIG. 6C This is a blow up of the split flexible bearing on the bag half of the half hinge axle and bearing mount
FIG. 7A This is the input device with a clamp edge attachments to match a flap hinge means on the bag front.
FIG. 7B This is a blow up of the alternative one part clap edge clamp attachment.
FIG. 8A This is the 2 attachment arrangement with side release buckle attachments.
FIG. 8B This shows the bottom side of the input device for the 2 attachment arrangement with side release buckle attachments.
FIG. 8C This is a blow up of input device side release buckle attachments.
FIG. 9A This is the 2 attachment arrangement with 2 button attachments.

FIG. 9B This shows the input device back side for 2 button attachments
FIG. 9C This is a blow up of input device button attachment.

DETAILED DESCRIPTION OF THE INVENTION

Figure 1A:
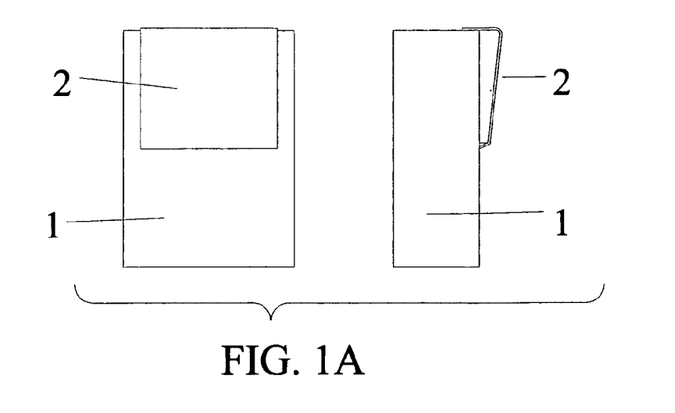
FIG. 1A The bag is shown closed with front and side views.
Figure 1B:
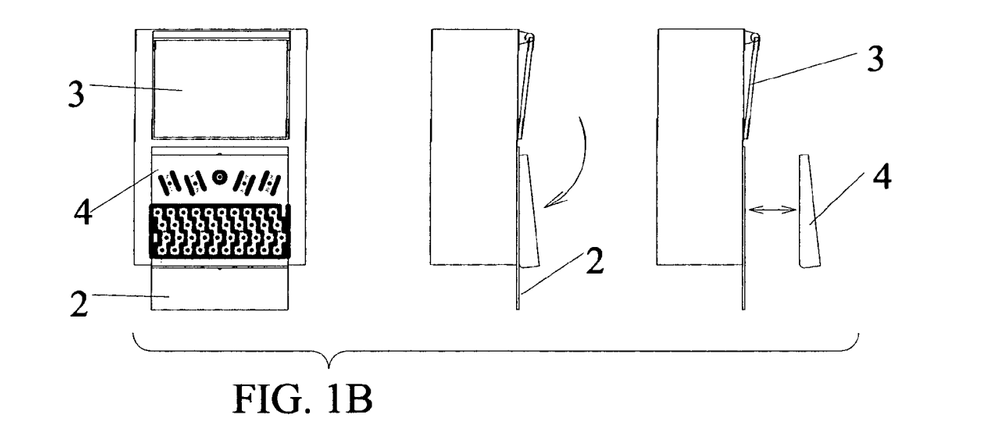
FIG. 1B This is the bag open with front and 2 side views.
Figure 1C:
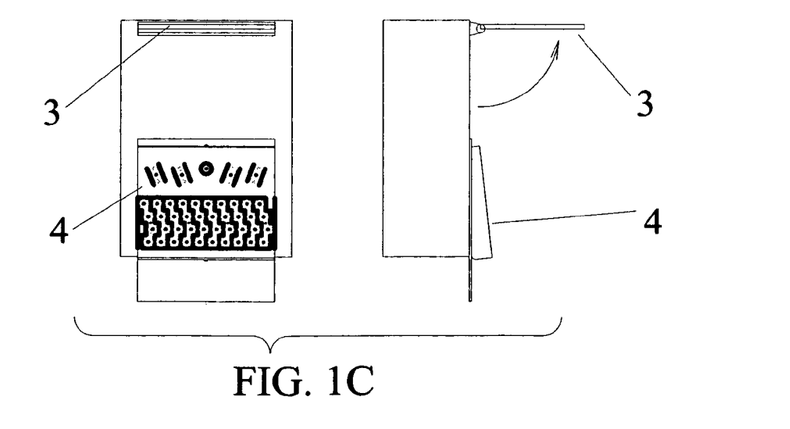
FIG. 1C This shows the bag is ready for use with front and side views.

As shown in FIGS. 1A, 1B and 1C the bag computer manual character input device 4 and cover is made for mounting on bag 1 front and to use with a bag computer. The bag front may be generally defined as the outside surface of the bag's front wall or any attachment structures or flap found on the outside of the bag's front wall. The input device may be a keyboard, electronic write pad or other electronic device used to manually input information to the bag computer. It may be a cover shaped to protect the bag computer's display/computer 3. To allow the input device to be replaceable, upgradeable or to change style it is designed to be removably fixed to the bag front or cover flap 2. For example, the keyboard for a bag computer may be changed to a write pad.

As shown in FIGS. 2A, 2B, 2C, 2D and 2E, the manual character input device is thin and approximately rectangular in shape. It has a front surface 7 facing up when the input device is pivoted perpendicular to the bag's front wall, a back surface 16 opposite the front surface, a proximal edge 6 closest to the bag's front wall when the input device is pivoted perpendicular to the bag's front wall, a distal edges 5 opposite the proximal edge and two side edges 8. In the case where the input device is attached directly to the bag's front wall by its back, the proximal edge is the one nearest the top of the bag and the operator's face when mounted to the bag. The input device may have a general use input/output tool such as an infrared antenna 12 or camera 14 located at its distal end or back side so it can be pointed to an external target. Electrical plugs for peripherals may be included. Communication with the bag computer may be by proximal edge electrical wire or wireless antenna 13. On the back of the input device there may be other controls associated with operating the bag computer, camera, external communicator or other built in input/output tool. Input devices with single edge attachments may have an attachment on the back side or other surface matching the cover flap so that they may both move together when shifted from the stored to operating positions.

Figure 2A:
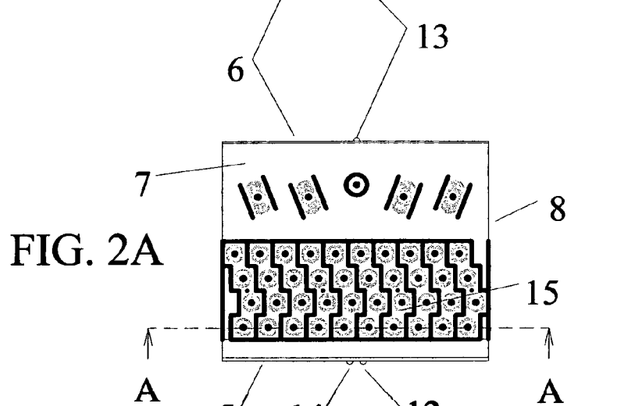
FIG. 2A This is a front view of the bag computer keyboard.
Figure 2B:
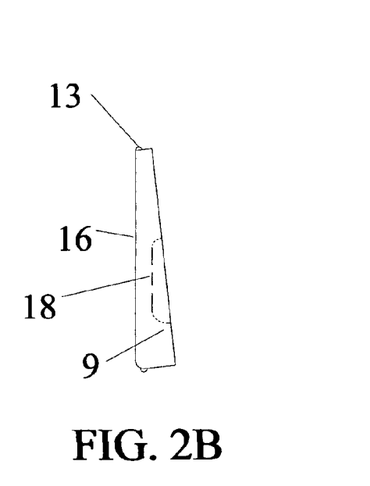
FIG. 2B This is a side view of the bag computer keyboard.
Figure 2C:
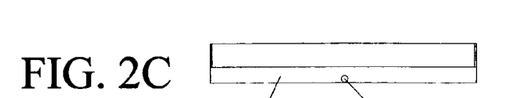
FIG. 2C This is a view of the proximal edge of the bag computer keyboard.
Figure 2D:
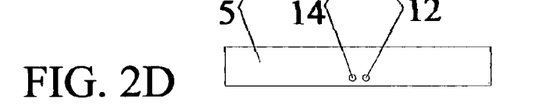
FIG. 2D This is a view of the distal edge of the bag computer keyboard.
Figure 2E:
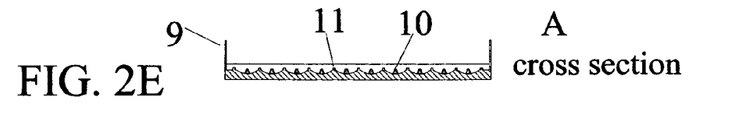
FIG. 2E This is a cross section of the bag computer keyboard, shown at A.

If the manual character input device is a keyboard, it may be ten keys wide 15. This allows for full size keys for typing while still keeping the keyboard size proportional to the average bag. The keyboard would be the width of the keys "a" to ";" on a standard QWERTY keyboard. Three or four rows may be included. Thumb keys substitute for essential keys farther to the right and left on the standard keyboard (e.g. space, return, shift, backspace, tab, change keyboard, camera or external communicator controls, etc). The result is a keyboard with standard ¾ inch keys and totaling about 8" wide. The key rows may have the standard offset or be inline. Alternative key placement or other controls may be programmed with software.

To make the keyboard easier to use without looking, tactile guides such as vertical thumb troughs, vertical finger ridges between the keys 11, depressions and/or outer edge palm ridges 9, may be included to assure finger position and to help stabilize the keyboard with the hands/palms.

To make the keyboard weatherproof, easier to clean, easier to use in the vertical position and without looking, it may have a continuous surface with depressions for each standard size key. Small actuating buttons, pegs or cones 10 may be at the bottom of each depression. These would be easier to use in the vertical position because they can be pushed down, in or up to be actuated.

The manual character input device may store over the display and it may be defined by structures 9 to align the keyboard to the display panel and/or computer, also on the bag front, to protect the display/computer while stored. These structures may be on any edge or the front of the input device and may include ridges or pins on the input device edges, may be wedged so to form a snug fit against the display and may include spacers to keep the keys from being depressed when stored. The structures may be molded into the input device body. Including the input device, they may form a box-like enclosure open on one side (the display side). The alignment structures may also touch the bag's front wall or display/computer hinge while closed to serve to protect the display from impact. They may be made of a material softer than the display so as to not scratch it. The alignment structures on the input device sides may include cut outs 18 (option shown in dotted line) to allow easier access to the keys by the hands. There may be one or more clips, snaps, hooks or other fasteners to secure the input device to display/computer.

Alternatively, the manual character input portion of the device may be missing from the body. The body with appropriate size shape and alignment structures then forms a cover to protect the bag computer and its display even if, for example, a touch screen is substituted for a separate character input device.

Input device may attach directly to the bag front wall or may be designed to pivot up over the computer/display unit when closed or down over the lower half of the bag front when in use. Pivoting may be accomplished by having an attachment on the input device proximal edge to match a hinge means on the bag front, by having a hinge means with attachments on the input device proximal edge or by attaching the input device to the inside of a cover flap or pivoting frame.

Figures 3A, 3B, 4A, 4B, 4C:
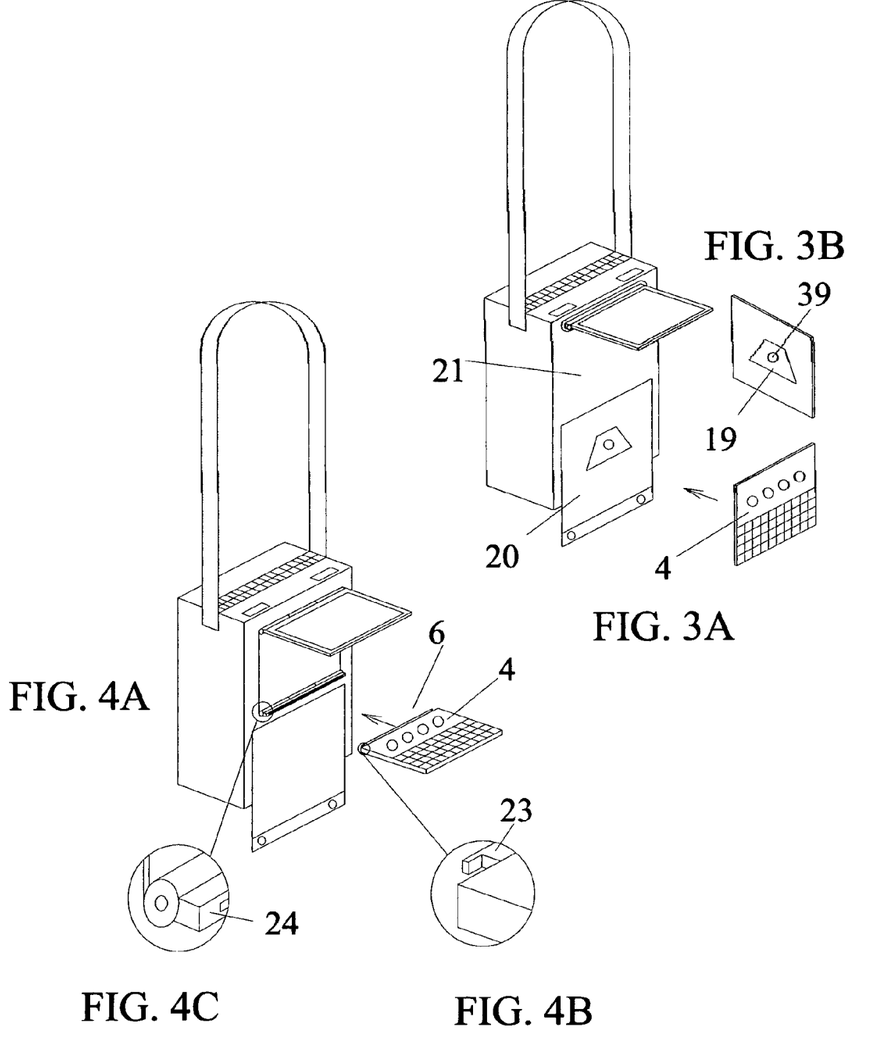
FIG. 3A This is the bag to match a back side mounted input device.
FIG. 3B This is the input device mounted on the bag with a back side bracket.
FIG. 4A This view shows the post and clip mounting arrangement.
FIG. 4B This is a blow up of input device edge post and clip mount.
FIG. 4C This is a blow up of matching post and clip mount on the bag.

The input device 4, as shown in FIGS. 3A and 3B, may be mounted by its back or edges to a docking port, bracket 19 or other holder on the bag's front wall 21 or on the inside of the bag's cover/mounting flap 20 or to a pivoting mounting frame. The input device mounts may include a bracket, right and left or top and bottom channels, shaped edges, body shape, notches, attachments or other features matching the bag's mounts. The input device may also have an electrical connection 39 associated with the mounting system to connect it with the bags interior.

Figures 5A, 5B, 6A, 6B, 6C:
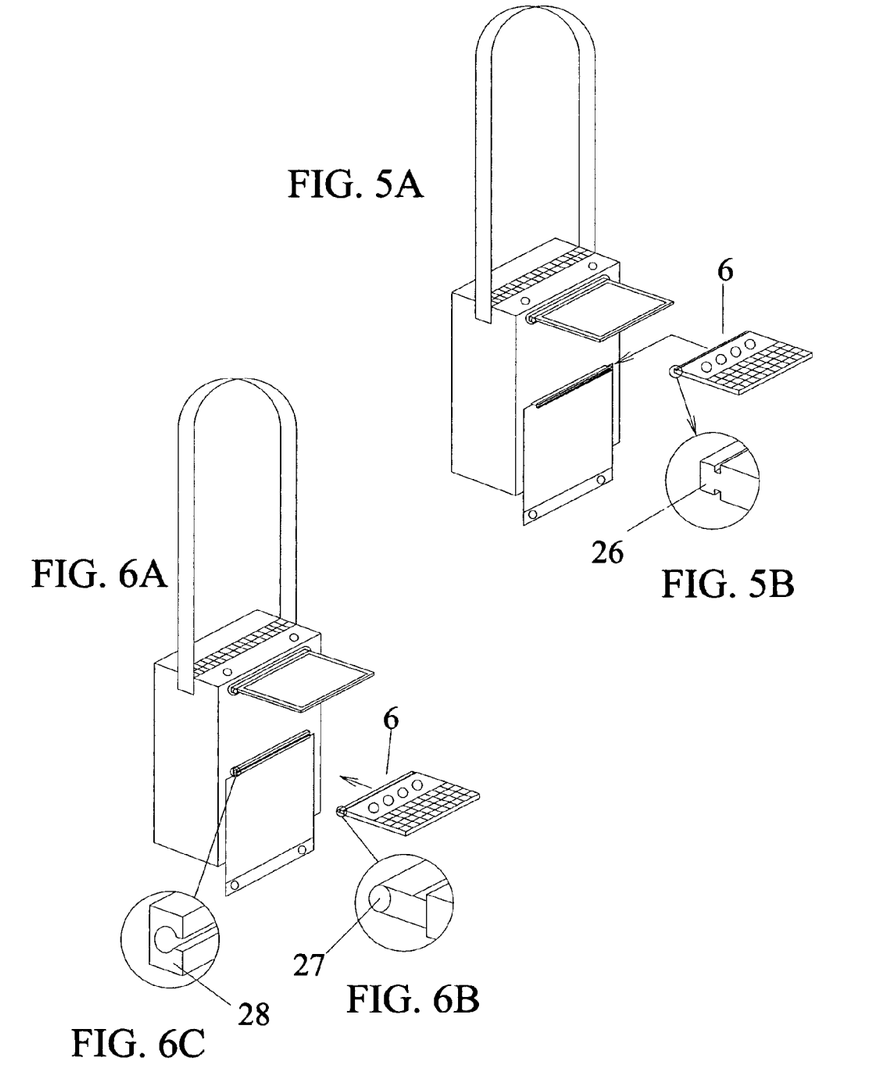

FIG. 4A shows there may be a single attachment on or near the proximal edge 6 of the input device 4 so that it may pivot by one edge independently of the cover flap. FIGS. 4B and 4C show that the attachment may plug-in as with a post and clip attachment 23 or its complementary fixture and matching the pivoting attachment 24 on the bag front. The post and clip attachment has one or more pins or flat bars to align and strengthen the connection while one or more clips hold the two parts together. Examples include side release buckles and common suitcase clasps. Alternatively, the attachment may be Velcro, zipper or other suitable attachment. As shown in FIGS. 5A and 5B the attachment may be designed to engage laterally using a channel 26 or lateral hooks on the proximal edge 6. The attachment on the proximal edge 6, shown in FIGS. 6A, 6B and 6C, may be a half hinge such as a bearing or an axle 27 connected to the input device and designed to match a complimentary half hinge on the bag front. The half hinge may be a bearing of flexible material and split lengthways 28 so the axle can snap into place.

Figures 7A, 7B:
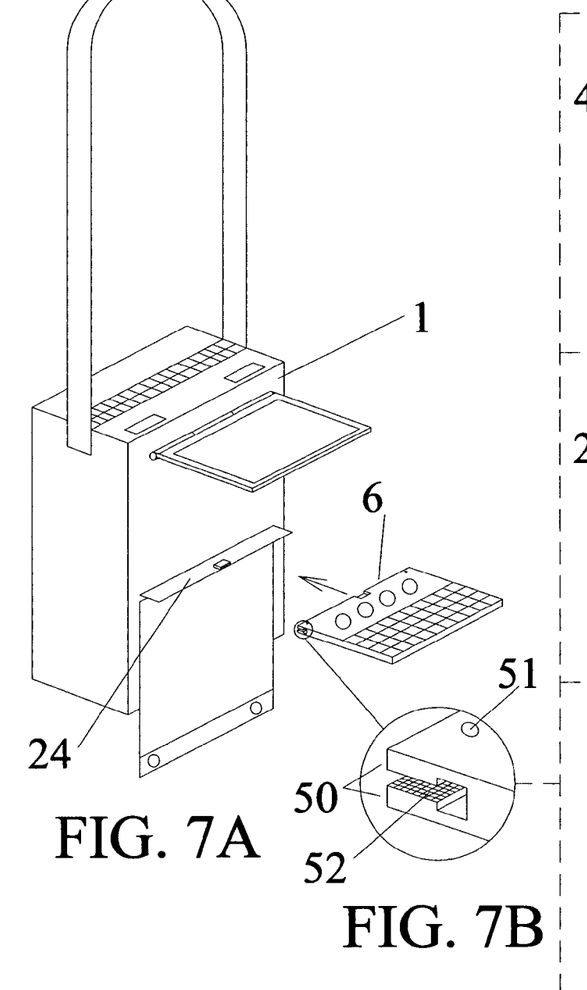

As shown in FIGS. 7A and 7B, the attachment holding the input device to the bag may consist of a clamp on the proximal edge 6. The clamp has two jaws 50 between which the bag's matching hinge means 24, such as flexible fabric, or flange from a bag's hinge means is placed. The jaws may be tightened with a clip, screws or other fastener means 51. The jaws may be made of one molded piece with a fastener to tighten the jaws around the bag's hinge means. The hinge means would usually be a flexible fabric so it can easily be sewn or riveted to the bag front wall.

Figure 7C:
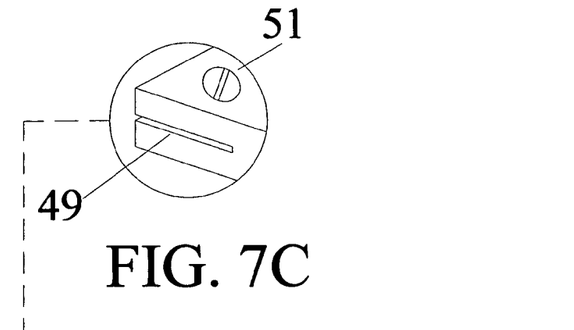
FIG. 7C This is a blow up of the alternative slot attachment.

Instead, as shown in alternative jaw configuration FIG. 7C, the clamp may be one or more slots 49 in the proximal edge, recessed areas in the front or back sides of the proximal edge, shaping and/or holes to accept a mounting plate/bracket on the bag's hinge means. The plate/bracket from the bag may be secured to the input device with screws, bolts, pins clips or other fastener 51 with matching holes in/through the input device and plate/bracket.

Figure 7D:
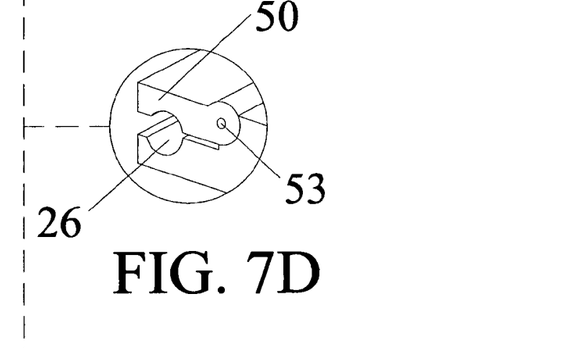
FIG. 7D This is a blow up of the alternative pivoting jaw clamp attachment.
Figure 7E:
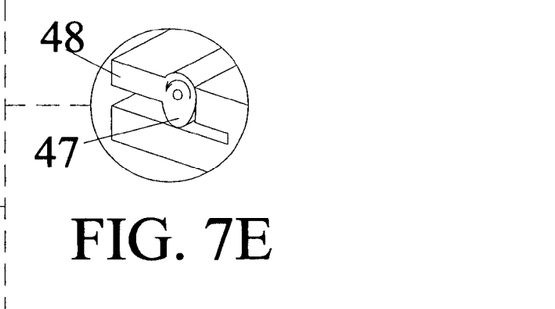
FIG. 7E This is a blow up of the alternative pivoting cam jaw clamp attachment.

As shown in alternative jaw configuration, FIG. 7D, the clamp may also have two separate jaws. One or both of these jaws 50 may be hinged 53 together so they can be opened to accept the bag's hinge means. The jaws may have a spring to hold the jaws closed. A clip or other fasteners may be included to hold the jaws closed and there may be one or more release buttons which may be recessed to avoid accidental release. Shown in FIG. 7E, one of the jaws may be a pivoting cam jaw 47 or other eccentric with lever 48 ("cam lock") to tighten and lock the jaws in place at the same time.

Figure 7F:
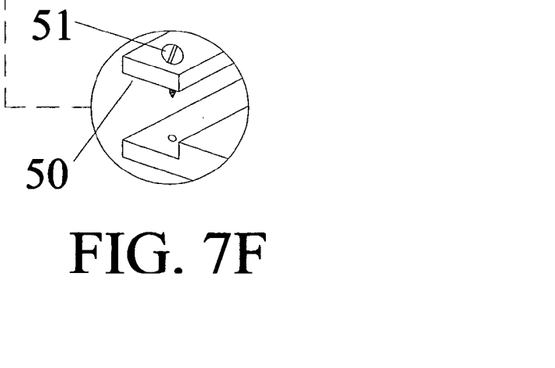
FIG. 7F This is a blow up of the alternative two part clamp attachment.
Figures 8A, 8B, 8C, 9A, 9B, 9C:
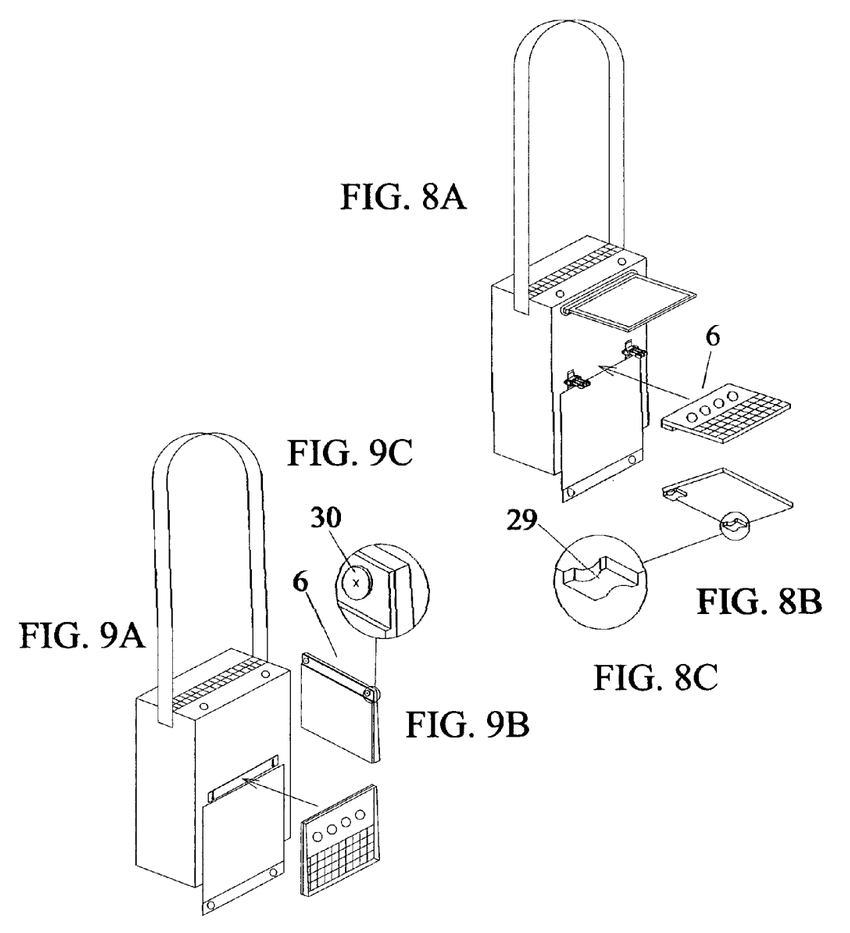

As shown in alternative jaw configuration, FIG. 7F, the clamp may have one removable jaw 50 and this may be tightened to the other jaw with screws, bolts, releasable clips or other fasteners 51.

The inside of the clamp jaws may be shaped to match the bag's hinge means. The jaws may form a channel, FIG. 7D 26, to match a bar, rope, thickened hem or other ledge on the hinge means edge. The jaws may have knurling FIG. 7B 52, teeth or ridges to grip a plain flexible fabric hinge means. The jaws may have matching projections and sockets/holes to match perforations in the bag's hinge means.

Figures 10A, 10B, 10C, 11A, 11B:
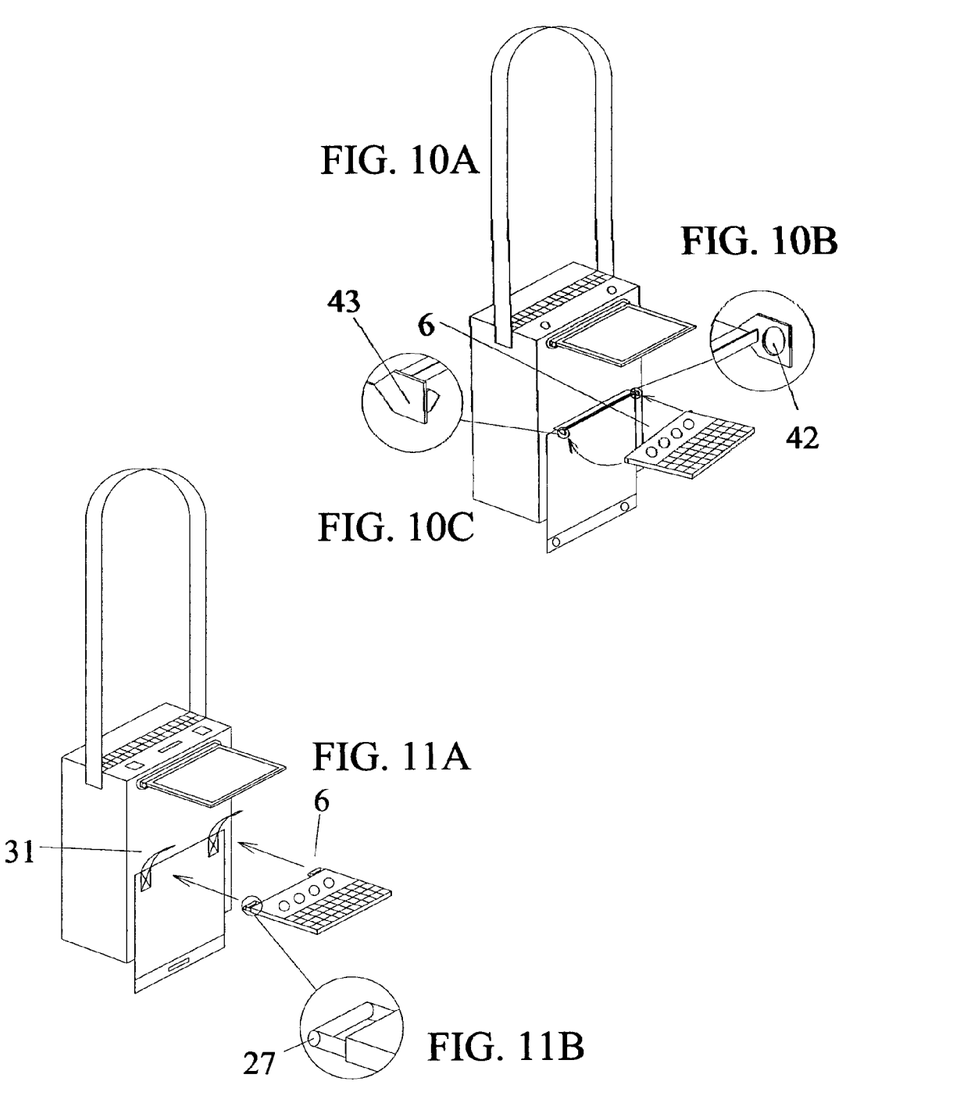
FIG. 10A This shows the footing and retainer attachment arrangement.
FIG. 10B This is a blow up of footing for footing and retainer attachment.
FIG. 10C This is a blow up of retainer for footing and retainer attachment.
FIG. 11A This is the 2 attachment arrangement with axle and strap bearing attachment.
FIG. 11B This is a blow up of input device axle for axle and strap bearing attachment.
Figures 12A, 12B, 13A, 13B:
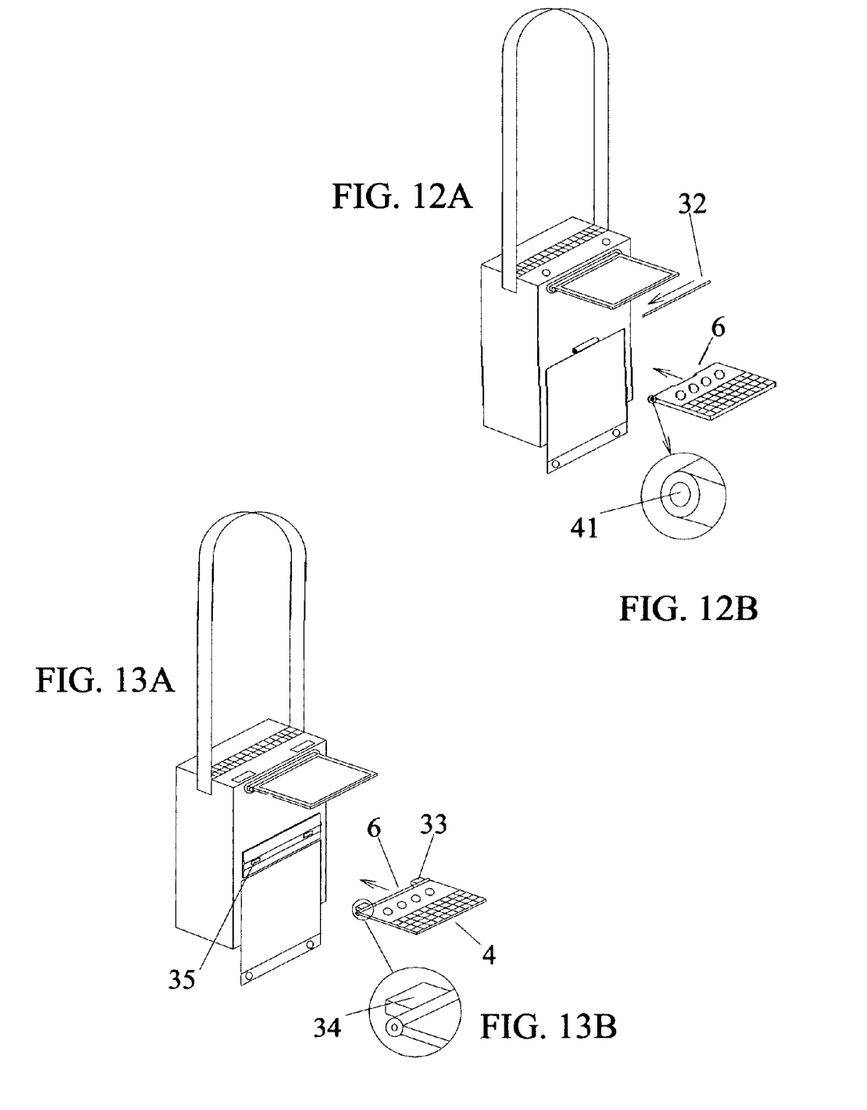
FIG. 12A This is the half hinge bearing with removable pin attachment arrangement.
FIG. 12B This is a blow up of proximal edge half hinge for half hinge bearing with removable pin attachment arrangement.
FIG. 13A This arrangement has a proximal edge hinge with pin attachments.
FIG. 13B This is a blow up of pin for proximal edge hinge with pin attachments arrangement.

FIGS. 8A, 8B, 8C, 9A, 9B and 9C show that there may be two attachments on or near the proximal edge, one near the right and one near the left sides of the input device's proximal edge 6. Examples include snaps, buttons 30, buckles, hooks, clips, side release buckles 29, or other attachment means. As shown in FIG. 10A, 10B, and 10C the two right and left attachments may be a footing and retainer attachment. The footing and retainer attachment has a footing 42 such as a pin or socket matching the bag on one corner of the input device's proximal edge and a retainer 43 such as a clip, ring or complimentary notch to hold the other corner of the input device's proximal edge 6 to the bag. Instead, the attachments may be half hinges such as one or more bearings or axles 27 connected to the input device's proximal edge and matching a complimentary half hinge on the bag front wall, as shown in FIG. 11A and 11B. The input device's axles may be designed to be secured to the bag with bag straps 31 threaded through them and allowing the input device to pivot horizontally. FIG. 12A and 12B show that the half hinge may be one or more half hinge bearings 41 on the proximal edge 6 matching ones on the bag front and secured together with a removable axle 32. Instead, the half hinges may be bearings of flexible material and split lengthways so the axles can snap into place. In another alternative, the half hinges may be short axles projecting from the right and left corners of the input device's proximal edge. The attachments may be molded into the input device body or separate attachments may be secured to it.

The two edge attachments may instead be clamps or slots as described above.

The attachment 33 for the bag may be pivotally secured to the input device body using one or more hinge means on or near the input device's 4 proximal edge 6 as shown in FIGS. 13A and 13B. The hinge may be capable of holding its angular position without using the hands. There may be one or more axle and bearing assemblies secured to the input device proximal edge and these may include one or more attachments such as a hanger blade, double hanger bars, bracket, pins 34, sockets or other attachment means designed to match stationary fixtures 35 on the bag front wall.

Figures 14A, 14B, 15A, 15B:
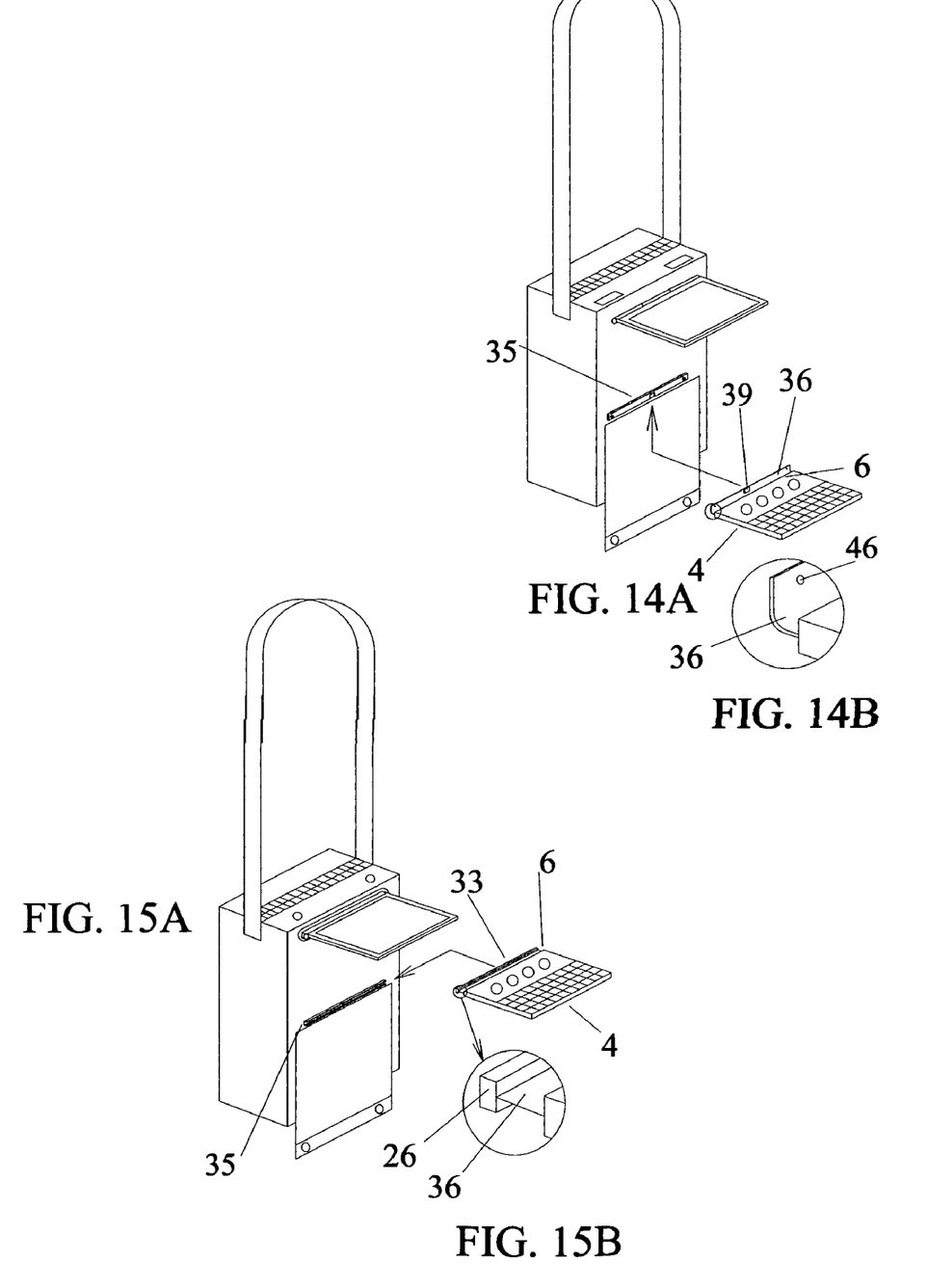
FIG. 14A This arrangement has a proximal edge flexible fabric hinge means to match stationary clamp jaws on the bag front.
FIG. 14B This is a blow up of the flexible fabric hinge means on the input device.
FIG. 15A This is the flexible fabric hinge means arrangement with channel attachment.
FIG. 15B This is a blow up of proximal edge fabric hinge means arrangement with lateral entry channel attachment.

FIGS. 14A and 14B show that the hinge means may be flexible fabric 36 clamped, screwed crimped or otherwise fastened to the proximal edge 6 of the input device body 4. The flexible fabric hinge means may be plain and adapted to match a stationary clamp 35 on the outside front wall of the computer bag. The hinge means may have a bar, rope, thickened hem or other ledge on its edge to match the bag's clamp jaws and there may be attachment perforations 46 to match projections in the bag's clamp jaws. Flexible fabric may be double layered so electrical wiring may pass between the layers to a connection plug 39 which matches a plug on the bag front.

As shown in FIGS. 15A and 15B, the input device's 4 flexible fabric hinge means 36 on the proximal edge 6 may have one or more attachments along its free edge which match attachments the bag. There may be one attachment 33 such as a channel fitting 26, zipper, post and clip, lateral hooks, Velcro or other suitable attachment which matches the corresponding attachment 35 on the bag front.

Figures 16A, 16B:
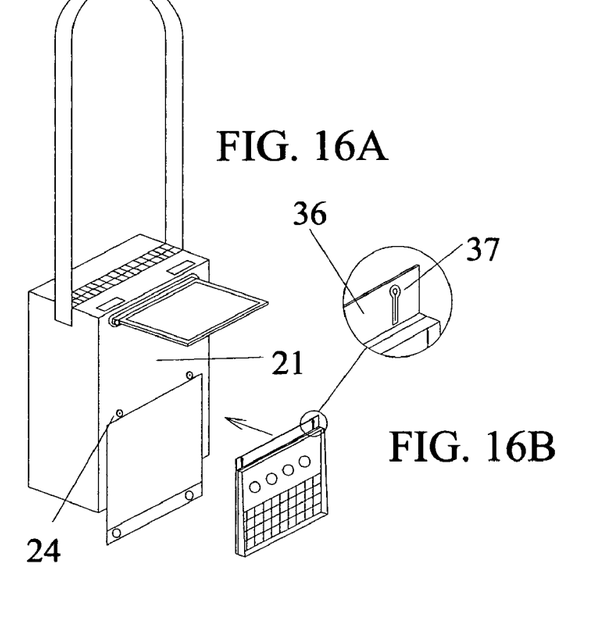
FIG. 16A This is the flexible fabric hinge means arrangement with button hole attachment.
FIG. 16B This is a blow up of flexible fabric hinge means arrangement with button hole attachment.

Instead, as in FIGS. 16A and 16B, there may be two or more attachments such as buttons, button holes 37, snaps, side release buckles or other fasteners in the flexible fabric 36 and matching attachment 24 on the bag front 21. The flexible fabric may fold back to and attach to the input device to form a half hinge bearing matching a half hinge axle on the bag front.

Figures 17A, 17B:
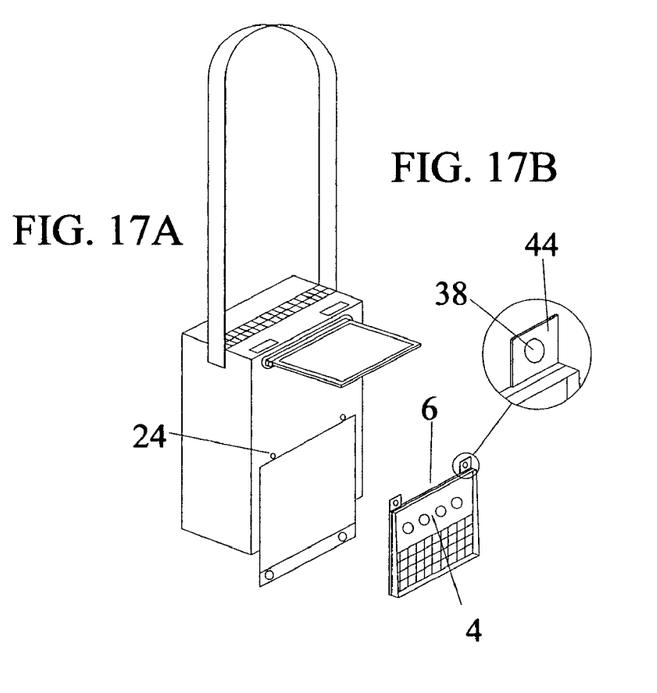
FIG. 17A This shows 2 flexible fabric tab mounts on the proximal edge of the input device.
FIG. 17B This is a blow up of 2 flexible fabric tab mounts with snap attachments.

Shown in FIGS. 17A and 17B, the flexible fabric on the input device 4 proximal edge 6 may be divided in two forming tabs 44, buckle straps or similar attachment supports near the right and left sides of the input device proximal edge. Attachments may include snaps 38, buttons, button holes, buckles, buckle holes, Velcro or other attachment means which match attachments 24 on the bag front.

Figures 18A, 18B:
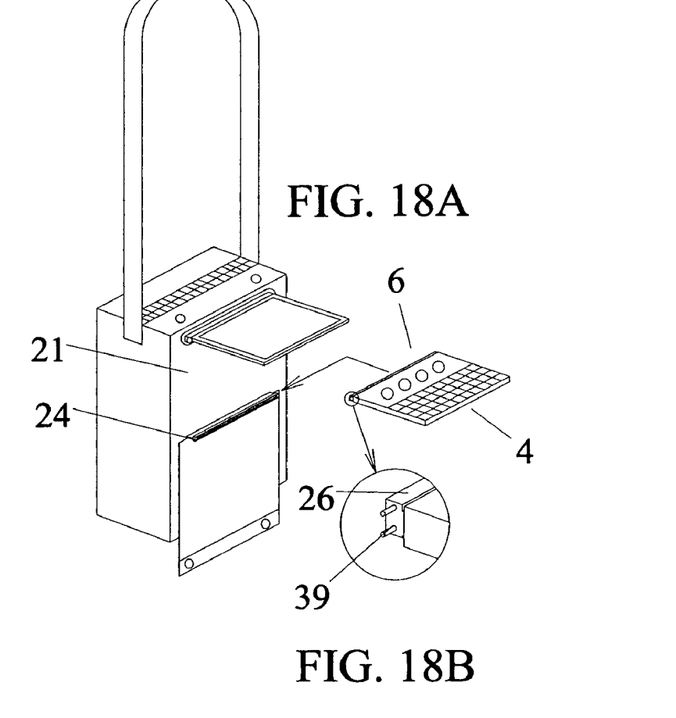
FIG. 18A This is a lateral entry channel mount with built in electrical connection.
FIG. 18B This is a blow up of electrical connection for a lateral entry channel mount.

A communication link is provided between the manual character input device and the bag's computer. The link may be located on the back of the input device so that it can connect to wires leading from/through a flap or pivoting frame and bag front to the bag's interior. Alternatively, the communication link between the input device and its computer may be located on its proximal edge 6. As in FIGS. 18A and 18B, the electrical connection 39 may be built into the input device 4 attachment structure such as a bracket, channel 26, docking port plug-in pins, clamp, slot, hinge or other attachment means. The connection may plug in or slide against a complimentary electrical fitting 24 on the bag front 21. If the input device includes a hinge means, the connection (eg wires) may lead from the input device body through the hinge or through layers in a flexible fabric hinge means to the attachment.

Figure 19:
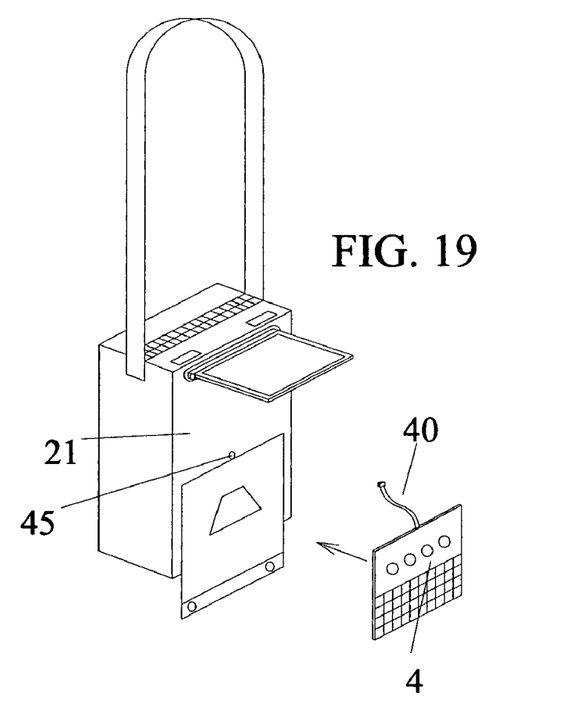
FIG. 19 This is an input device with wire and plug as the proximal edge electrical connection.

FIG. 19 shows that the electrical connection from the input device 4 may be separate from the attachments. It may be wires 40 which may have a plug and lead from the input device through an opening 45 the bag front 21 to the bag interior. Instead, the connection may be a plug positioned to accept a wire/plug leading from the bag interior though the bag's front wall. The wire or plug on the input device may be located on the proximal edges to facilitate connection.

As shown in FIGS. 2A, 2B, 2C and 2D, the input device may, alternatively, have its own power source and equipment to broadcast input/output information to/from its computer via wireless radio or line-of-sight (infrared) broadcasting. An infrared antenna 13 may be located near the proximal edge 6 of the input device so that it may broadcast up toward the display back, computer body, computer hinge or, if present, turning lens on the bag front which may direct the signal to the body of the computer inside the bag. This antenna may also receive/broadcast information for transfer through the input device to a distally mounted input/output tool. The antenna's signal angle may be fanned vertically so that the input device may be used when pivoted in either the vertical or horizontal position. The associated batteries, antennas, modem and broadcasting equipment would be included.

The preferred embodiments of the invention described herein are exemplary and numerous modifications, variations, and rearrangements can be readily envisioned to achieve an equivalent result, all of which are intended to be embraced within the scope of the appended claims.

I claim:

1. A computing device comprising:
   a. a bag comprised of a front wall including an outside surface;

b. a display stored on the outside surface of the bag front wall; and c. an input device comprised of a proximal edge, and a distal edge, wherein the input device is pivotally attached to the outside surface of the front wall, the input device being pivotable to at least a closed position over the display.

2. The computing device of claim 1, wherein the input device is further comprised of a camera.

3. The computing device of claim 1 wherein the bag is further comprised of a cover flap pivotally attached to the bag front and the input device is attached to the cover flap so that the input device is pivotable to at least a closed position over the display.

4. The computing device of claim 3 wherein the input device is further comprised of an attachment to removably attach the input device to the cover flap.

5. The computing device of claim 1, wherein the input device is further comprising at least one attachment on or near the proximal edge adapted to removably attach the input device to the bag and pivot around the proximal edge.

6. The computing device of claim 5, wherein the attachment on or near the proximal edge is comprised of two jaws.

7. The computing device of claim 5, wherein the bag is further comprised of an attachment on the bag front wall, the attachment configured to match the proximal edge attachment and removably join the input device to the bag.

8. The computing device of claim 7, wherein the attachment is comprised of flexible fabric.

9. The computing device of claim 1, wherein the input device is further comprised of an alignment structure configured to shape the input device to fit and protect the display.

10. The computing device of claim 1, wherein the input device is further comprising an electrical connection configured to lead to an interior of the bag.

11. The computing device of claim 1, wherein the bag front wall is further comprised of an opening through bag front wall, the opening configured to allow an electrical connection from input device to an interior of the bag.

12. The computing device of claim 1, wherein the input device is further comprised of a keyboard.

13. A device for protecting a display storable on a bag, the device comprising:

a. a cover comprised of a proximal edge and a distal;

b. an alignment structure on the cover, the alignment structure configured to shape the cover to fit and protect a display storable on the bag; and c. an attachment on the cover, the attachment configured to pivotally attach the cover to the bag.

14. The device of claim 13 wherein the attachment is adapted to attach the cover to a cover flap pivotally attachable to the bag.

15. The device of claim 13, wherein the attachment is located on or near the proximal edge of the cover.

16. The device of claim 15, wherein the attachment on or near the proximal edge is comprised of two jaws.

17. The device of claim 13, wherein the cover is further comprised of an input device.

18. The computing device of claim 17, wherein the input device is further comprising an electrical connection configured to lead to an interior of the bag.

19. The device of claim 17, wherein the input device is further comprised of a camera.

20. The device of claim 17, wherein the input device is further comprised of a keyboard.

21. A computing device for pivotally mounting and operating on a bag, the device comprising:

a. an input device comprised of a proximal edge and a distal edge;

b. one or more attachments on or near the proximal edge configured to removably attach the input device to the bag and pivot around the proximal edge.

22. The computing device of claim 21, wherein the input device is further comprised of a camera.

23. The computing device of claim 21, wherein the attachment on or near the proximal edge is comprised of two jaws.

24. The computing device of claim 21, wherein the input device is further comprised of an alignment structure configured to shape the input device to fit and protect a display storable on the bag.

25. The computing device of claim 21, wherein the input device is further comprising an electrical connection configured to lead to an interior of the bag.

26. The computing device of claim 21, wherein the input device is a keyboard.

* * * * *